Figure 1:
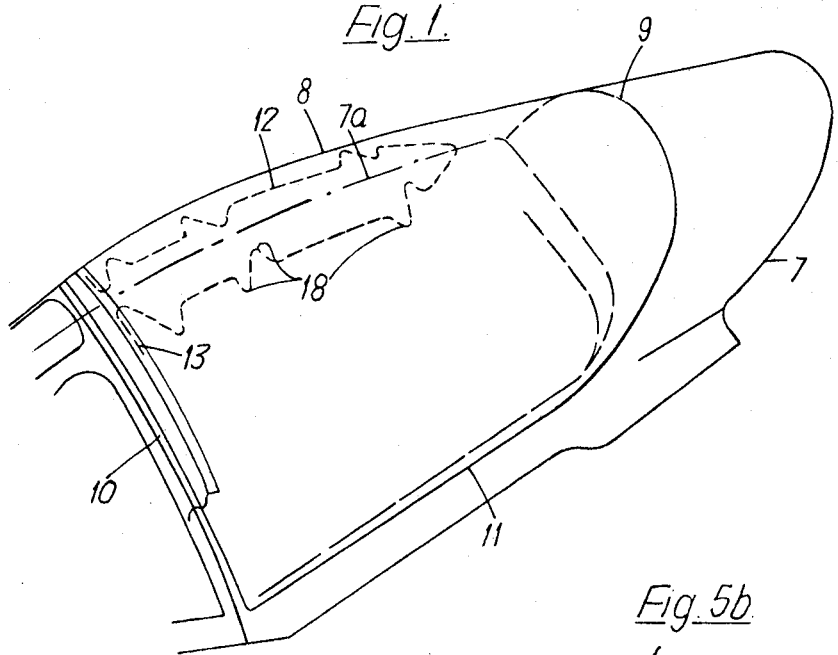

United States Patent [19]
Galton

[11] 3,806,069
[45] Apr. 23, 1974

[54] AIRCREW ESCAPE SYSTEMS

[75] Inventor: Graham Norman Galton, Kingston-upon-Thames, England

[73] Assignee: Hawker Siddeley Aviation Limited, Kingston-upon-Thames, Surrey, England

[22] Filed: June 12, 1972

[21] Appl. No.: 262,034

[30] Foreign Application Priority Data
June 10, 1971 Great Britain.................... 19984/71

[52] U.S. Cl......................... 244/122 AF, 102/49.5
[51] Int. Cl............................................... B64c 1/32
[58] Field of Search... 244/122 AF, 122 AE, 122 A, 244/121; 102/49.5, 24 HC; 49/141; 89/1 B, 1.817

[56] References Cited
UNITED STATES PATENTS

| | | | |
|---|---|---|---|
| 3,561,703 | 2/1971 | Stencel | 244/122 AF |
| 3,172,330 | 3/1965 | Lidmalm et al. | 89/1.817 |
| 3,135,163 | 6/1964 | Mechlin, Jr. et al. | 89/1.817 |
| 3,465,482 | 9/1969 | Chandler | 102/49.5 |
| 3,674,227 | 7/1972 | Jacobson | 244/121 |
| 3,670,998 | 6/1972 | Charleville et al. | 244/122 AF |
| 3,323,544 | 6/1967 | Francis | 102/24 HC |
| 3,729,154 | 4/1973 | Deplante | 244/122 AF |

FOREIGN PATENTS OR APPLICATIONS

| | | | |
|---|---|---|---|
| 411,628 | 4/1966 | Switzerland | 89/1.817 |
| 1,029,240 | 5/1966 | Great Britain | 102/49.5 |

*Primary Examiner*—Duane A. Reger
*Assistant Examiner*—Galen L. Barefoot
*Attorney, Agent, or Firm*—Rose & Edell

[57] ABSTRACT

An aircraft cockpit canopy transparency has applied to it miniature detonating cord to initiate fracture and break-up of the canopy for aircrew emergency ejection purposes, and, as well extending round the periphery of the transparency, a portion of the cord is laid in a loop extending away from the periphery and into the region at the top of the transparency through which the aircrew member will pass in the event of an emergency ejection. The cord loop has a series of sharp bends in it to act as crack initiators and is semi-circular in cross-section with its flat face secured to the transparency surface by a curable adhesive.

2 Claims, 7 Drawing Figures

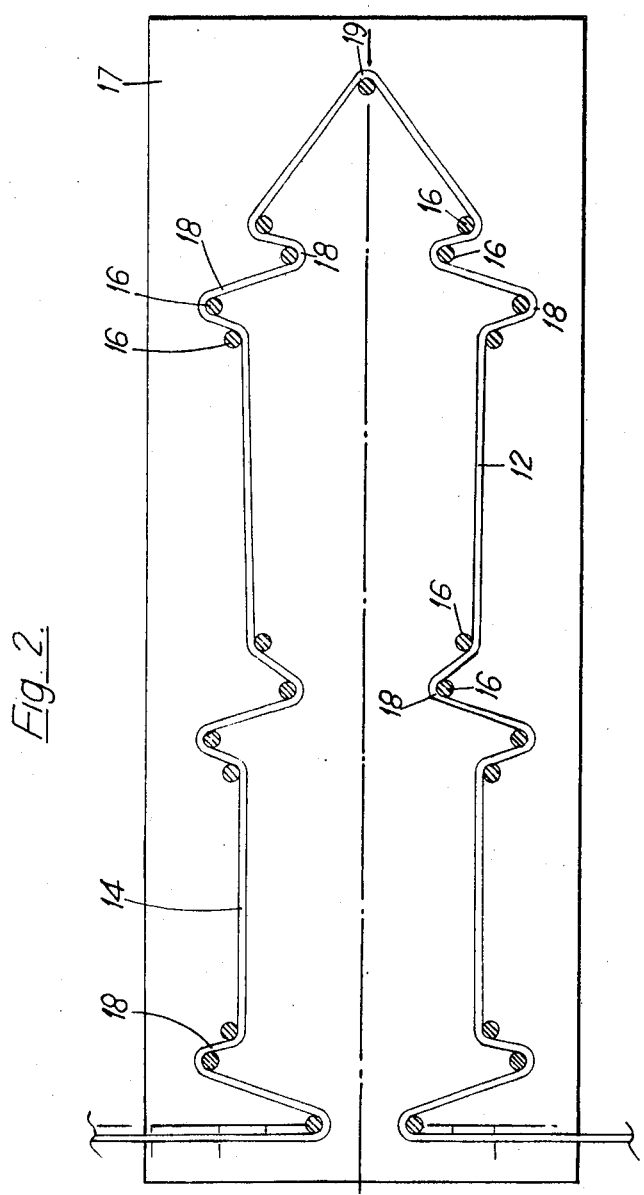

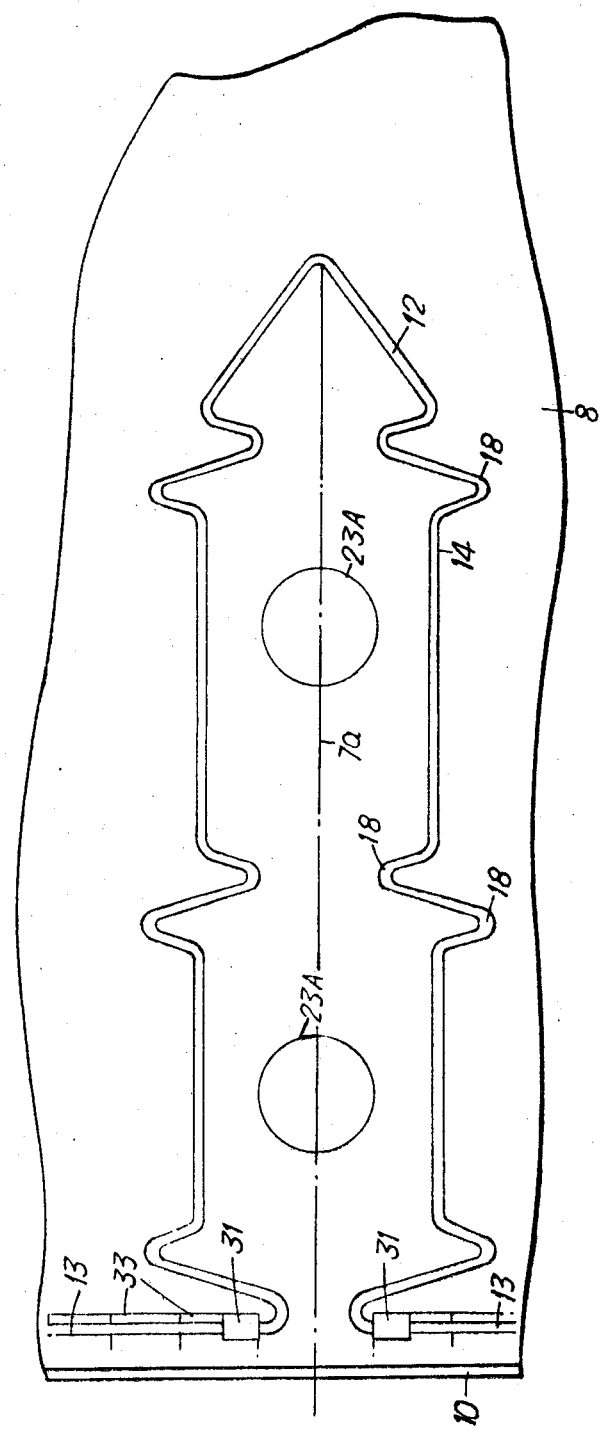

AIRCREW ESCAPE SYSTEMS

This invention relates to the emergency escape of aircrew from an aircraft.

U.S. Patent application Ser. No. 217,896, filed Jan. 14,1972, explains how, in order to enable an aircrew member to escape through the cockpit canopy of an aircraft, for instance upon operation of an ejector seat, an explosive cord device, known as 'Miniature Detonating Cord' or 'MDC', may be employed to cause fracture and break-up of the canopy transparency, or at least that area of it through which the aircrew member will pass. For various reasons, such cord has hitherto commonly been contained in an elastomer back-up extrusion.

It is also explained that there are difficulties in ensuring that such cord exerts its blast energy, upon detonation, in a direction to give good cutting of the canopy material and dispersal of the broken fragments out of the path of the escaping crew member, without blowback of material or undesirable blast pressures being directed toward the crew member. It would be possible to extend such MDC, previously only mounted around the periphery of the canopy transparency, across the surface of the transparency and thereby obtain a more concentrated and calculable fracture and dispersion in way of the ejector seat trajectory path. However, with the presence of an elastomer back-up extrusion containing the circular MDC such a scheme can lead to considerable and unacceptable vision restriction.

As a step toward overcoming these problems, U.S. Patent application Ser. No. 227,433, filed Feb. 18, 1972 describes a novel form of detonating cord eliminating the necessity for the elastomer back-up extrusion, meeting the requirements of blast containment and reflection, and able to be adhesively attached over the transparency surface with very little vision restriction. It is now an object of the present invention to achieve further improvement in the use of MDC.

According to the present invention the cord, e.g. of aforementioned U.S. patent application Ser. No. 227,433, while located around the periphery of the canopy transparency, is also extended in loop form across the surface of the transparency away from the periphery, being laid in a predetermined pattern particularly concentrated in the area through which the escaping crew member will pass on ejection.

The loop length and configuration will depend on fragmentation requirements. Whereas a single plain loop may, in conjunction with the peripheral run, impart sufficient blast energy to give an acceptable canopy break-up, it may, on the other hand, be desirable to influence the break-up pattern by the provision of supplementary crack initiators, in the form of more or less sharp bends in the loop, located at suitable positions along the main loop and which on detonation will give component detonation forces substantially at right angles to the normal cord run. The loop pattern may arise from any point along the peripheral run depending on the required location of the pattern. In the preferred arrangement, the loop originates at or near the upper centre line of the canopy at the forward arch member and extends rearwards so that the pattern is concentrated in that area immediately over the ejection path. With the loop formed as an extension of the peripheral run there is only one continuous length of cord, the whole being detonated from a single mechanical detonator.

The efficiency of the detonation effect will be dependent on the careful control of pattern formation; location and bonding to the canopy surface. It would be impracticable to apply the cord manually direct to the internal surface of the shaped canopy transparency for a variety of reasons. For example, the handling of a substantial length of cord in the enclosed area could result in cord damage, adhesive smudge and incorrect seating of the cord on the canopy surface. Similarly, the crack initiation bends have proportions requiring controlled bend radii and angularity if incorrect detonation and fragmentation are to be avoided. It is, therefore, a further object of the present invention to provide an acceptable method of cord loop pattern application.

Semi-circular MDC as described in U.S. Patent application Ser. No. 227,433 filed Feb. 18, 1972 is preformed into the required pattern upon a forming template whose contour corresponds to that of the aircraft canopy transparency. The cord follows a specified pattern outlined upon the forming template. On completion of the pattern, an MDC transfer plate of matching contour is superimposed upon it and by the use of adhesive tape the pattern is transferred to the transfer plate in such manner that when the cord/ transfer plate assembly is removed from the forming template and inverted, the cord is uppermost and the flat face is exposed for the application of a suitable adhesive.

Prior to the offering up of the MDC pattern to the canopy, it is desirable to locally abrade the highly polished surface of the transparency in a controlled manner at the crack initiator locations in order to provide a good adhesive key.

The cord/transfer plate assembly is inserted into the canopy and self-adhesive lead tape is applied to hold the cord pattern to the transparency. When the cord is adequately secured, the transfer plate is removed and the cord/canopy assembly is cured for an appropriate period.

Figure 5B:
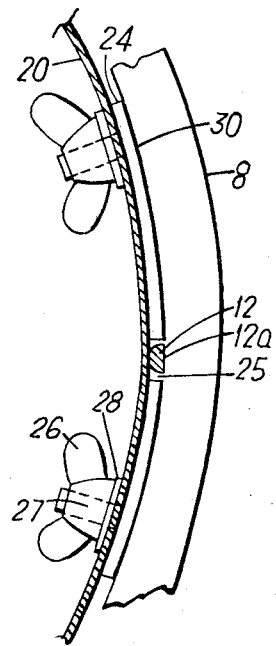
Figure 5A:
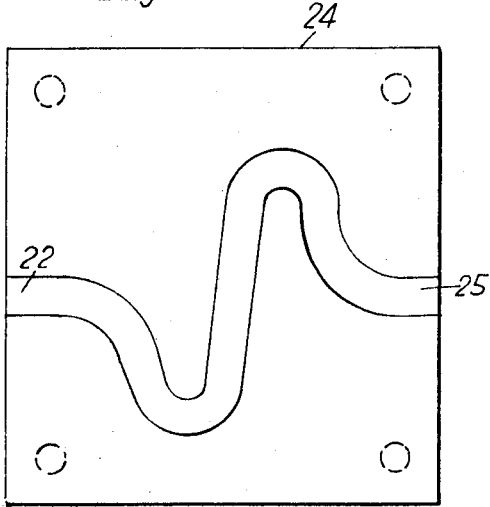
Figure 4:
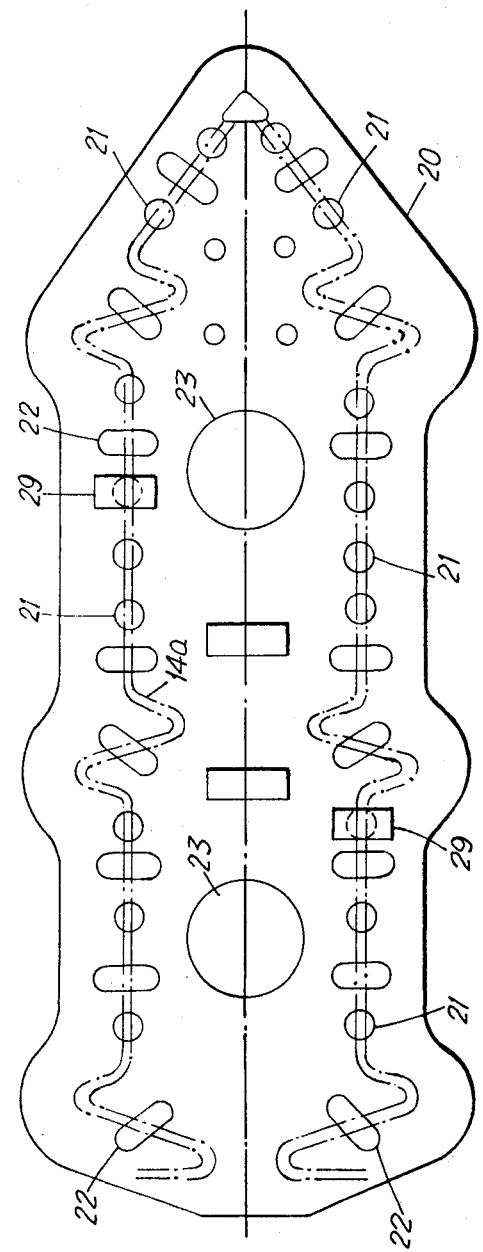

One technique according to the invention will now be described in greater detail, by way of example, with reference to the accompanying drawings, in which:

FIG. 1 is a pictorial view of a cockpit canopy to which the invention has been applied, FIG. 2 is a plan of an MDC forming template, FIG. 3 shows the template in end view, FIG. 4 shows in plan an MDC transfer plate, FIGS. 5a and 5b are plan and end views of an abrading template, and FIG. 6 is a plan view of the MDC applied to the canopy.

In FIG. 1, a cockpit canopy 7 has a transparent hood 8 which is bounded by a rear arch 9, a forward arch 10, and canopy sill structure 11. Located symmetrically about the top centre line 7a of the canopy is a run of minature detonating cord 12 laid in a patterned loop leading out of the peripheral cord run 13 near the forward arch member 10. The pattern is shown in broken line to indicate that the cord is laid on the inner surface of the transparency; it has a series of more or less sharp bends 18 to act as crack initiators when the cord is detonated.

FIG. 2 shows the MDC forming template 17 in plan, this template having a contour as shown in FIG. 3 corresponding to that of the canopy transparency in the region of the top centre line 7a. Outlined upon the surface is the required cord pattern form 14 and inserted at each bend radius of the cord pattern is a removable circular forming disc 16 on a mounting peg 15.

Having determined the mid point along the MDC length, forming of the pattern commences at 19, with the circular discs 16 defining the bends 18, and the flat face 12a of the cord 12 being kept in firm contact with the forming template 17. This is particularly important to prevent lifting at the edges. Where, as in this case, the pattern forms part of the total peripheral cord run the remainder of the cord, on completion of the pattern 14, is coiled and carefully secured at a suitable location.

FIG. 4 shows an MDC transfer plate 20 which is used for transferring the MDC pattern from the template 17 to the canopy 7. The transfer plate 20 is moulded sheet whose external contour is substantially the same as the internal canopy form. It is also transparent for visual aid and it has the MDC pattern 14 outlined upon it at 14a. Situated along the cord path 14a are a number of circular and elongated cord attachment apertures 21 and 22, respectively. Circular holes 23 correspond in size and location to locating blocks 23A temporarily attached to the inner surface of the canopy transparency, as shown in FIG. 6. Other such blocks (not shown) may be provided temporarily on the canopy to locate the transfer plate 20 at its edges.

With the forming of the pattern on the template 17 completed the MDC transfer plate 20 is superimposed upon the pattern, being accurately located by aligning the MDC with the outlined pattern 14a on the transparent transfer plate. Prior to this operation pieces of self-adhesive tape 29 are laid on the back of the transfer plate across the circular apertures 21, adhesive face down. With the plate 20 in position upon the MDC pattern 14 slight pressure upon the pieces of tape adheres the cord 12 to the plate 20 and the cord/transfer plate assembly is carefully removed from the forming template 17 and inverted so that the cord is uppermost, the flat 12a of the cord being exposed ready for the application of a suitable adhesive.

The MDC transfer plate 20 can be mounted, if desired, upon a suitable convex support fixture, not shown, until inserted into the canopy transparency.

Because of the tight bend radii along the pattern loop 14, particularly at the crack initiator points 18, adequate adhesion of the cord 12 to the highly polished transparency surface 8 may be difficult to achieve and lifting may tend to occur at these point. To overcome this problem local abrading of the canopy surface at these initiator regions will provide a more positive adhesive bond, but the abraded areas must be carefully controlled for canopy strength considerations and to avoid undesirable vision restriction.

FIGS. 5a and 5b show a typical abrading template 24 in which is cut a meandering slot 25 representing an initiator bend region 18 of the MDC pattern run 14. With the aid of these templates 24 self-adhesive masking shapes 30 are cut out. The templates are then temporarily bolted to the cord/transfer plate assembly, as shown in FIG. 5b, by means of studs 27 and nuts 26. With each template 24 thus registered with respect to its appropriate initiator region 18 of the cord 12, and the self-adhesive mask 30 carried by the template 24, the assembly is offered up to the transparency 8 and the self-adhesive mask 30 thereby located on and adhered to the surface of the transparency 8, which is carefully abraded through the mask 30 once the template 24 and transfer plate 20 have been removed. On completion of the abrading the masks 30 are removed. The abrading templates 24 are also detached from the transfer plate 20.

A suitable adhesive is next applied to the flat face 12a of the upturned MDC pattern on the transfer plate 20. The MDC transfer plate, removed from its supporting fixture if any, is then inverted with the MDC downwards and lowered on to the transparency surface 8. It is accurately aligned with the transparency centre line 7a by use of the circular locating blocks 23A, previously referred to. Pieces of self-adhesive lead foil tape (not shown) are employed to clip the cord to the transparency at adequate pitches along the pattern 14, being applied through the elongated apertures 22 in the transfer plate 20. When the cord 12 is adequately secured to the canopy 8 the tapes 29 holding the cord to the transfer plate 20 are removed and the transfer plate is lifted clear of the canopy. Additional taping is applied to secure the cord 12 firmly to the canopy 8 throughout the whole pattern run 14 prior to the commencement of the curing cycle. Also at this stage, and with reference to FIG. 6, glass-cloth reinforcing pads 31 are bonded over the MDC near the front arch position 10 where the adhered pattern 14 ends and the unglued peripheral run 13 of the cord 12 commences, secured, for example, with retaining plates 33 as described in aforementioned U.S. Patent application Ser. No. 217,896. This increases the resistance to adhesive peel.

With an acceptable bond of the pattern to the canopy achieved, the remainder of the peripheral run may be completed, such as in the manner laid down in aforementioned U.S. Patent application Ser. No. 217,896.

The invention has been described in the context of a single pattern as, for example, in a single seater aircraft. However, it can be similarly applied in a multiple seater layout or where it is required to employ multiple patterns to further influence the break-up pattern.

Also in the arrangement described, a single piece cord is employed with the pattern integral with the peripheral run, the whole detonated by a single unit. Alternatively, the cord pattern or patterns may be formed separately from the peripheral run and either independently detonated or interconnected to the remainder of the run by known forms of connector or manifolds.

What I claim is:

1. An aircraft cockpit canopy transparency provided with detonating cord (MDC) to facilitate fracture and break-up of the canopy for aircrew emergency ejection purposes, wherein the detonating cord, as well as being located around the periphery of the canopy transparency, is also extended in loop form across the surface of the transparency away from the periphery, being laid in a predetermined pattern particularly concentrated in the area through which the escaping crew member will pass on ejection, said loop including a series of sharp substantially acute-angled bends as initiators of cracks in directions transverse to the general direction of extension of the cord loop.

2. A canopy transparency according to claim 1, wherein the loop extends rearward from a forward arch member of the canopy and is symmetrical about the fore-and-aft top center line of the canopy, with said crack-initiating bends projecting laterally of the loop so as to initiate cracks substantially at right angles to said center line.

* * * * *